(12) United States Patent
Shute et al.

(10) Patent No.: US 8,307,962 B2
(45) Date of Patent: Nov. 13, 2012

(54) END STABILIZATION FOR BRAKE SHOES EXTENDING BEYOND THE ENDS OF THE BRAKE HEAD

(75) Inventors: Bruce W. Shute, West End, NC (US); Thomas W. McCabe, Southern Pines, NC (US); Timothy A. Rumph, Laurinburg, NC (US)

(73) Assignee: RFPC Holding Corp., Wilmerding, PA (US)

( * ) Notice: Subject to any disclaimer, the term of this patent is extended or adjusted under 35 U.S.C. 154(b) by 978 days.

(21) Appl. No.: 12/128,228

(22) Filed: May 28, 2008

(65) Prior Publication Data
US 2009/0294227 A1   Dec. 3, 2009

(51) Int. Cl.
*F16D 65/04* (2006.01)
(52) U.S. Cl. ............ 188/235; 188/250 B; 188/250 R
(58) Field of Classification Search .......... 188/235, 188/250 R, 250 B, 251 A, 251 R
See application file for complete search history.

(56) References Cited

U.S. PATENT DOCUMENTS

| | | | | |
|---|---|---|---|---|
| 838,774 | A | * 12/1906 | Crone | 188/236 |
| 1,328,595 | A | * 1/1920 | Sargent | 188/247 |
| 1,470,477 | A | * 10/1923 | Pettis | 188/258 |
| 1,639,256 | A | 8/1927 | Christianson et al. | |
| 1,893,306 | A | 1/1933 | Sargent | |
| 2,331,563 | A | * 10/1943 | Murphy | 188/258 |
| 2,660,267 | A | 11/1953 | Sweger et al. | |
| 2,869,689 | A | * 1/1959 | Wilson | 188/251 R |
| 2,885,037 | A | * 5/1959 | Wilson | 188/251 R |
| 2,933,164 | A | 4/1960 | Baechtel | |
| 3,235,952 | A | 2/1966 | Arrasmith | |
| 3,912,053 | A | 10/1975 | Spaeth | |
| 4,000,792 | A | 1/1977 | Guldin | |
| 4,020,928 | A | * 5/1977 | Beetle | 188/237 |
| 4,181,202 | A | * 1/1980 | Trajtenberg et al. | 188/252 |
| 4,466,513 | A | 8/1984 | Dedek | |
| 5,407,031 | A | * 4/1995 | Christie | 188/29 |
| 5,595,267 | A | 1/1997 | Kahr | |
| 6,135,249 | A | 10/2000 | Kahr | |

(Continued)

OTHER PUBLICATIONS

"Anchor High Friction Composition Brake Shoe"; Nov. 2, 1982; 1 page; Drawing No. Anchor H35-T; Griffin Wheel Company.

(Continued)

*Primary Examiner* — Robert A Siconolfi
*Assistant Examiner* — Mariano Sy
(74) *Attorney, Agent, or Firm* — The Webb Law Firm

(57) ABSTRACT

Disclosed is an end stabilized backing plate for an extended length brake shoe for use in a railway braking system. The backing plate includes an elongated main portion extending along a longitudinal axis. This main portion has a front face, a back face, a first end portion and an opposed second end portion. A first and second pair of tab members are provided on each of the first and second end portions. These tab members extend in a substantially perpendicular direction with respect to the main body and function to stabilize the end portions of the extended length brake shoe which extend beyond the length of a brake head and reduce and/or eliminate cracking of these end portions of the brake shoe. A method of stabilizing end portions of an extended length brake shoe is also disclosed.

26 Claims, 10 Drawing Sheets

U.S. PATENT DOCUMENTS

| | | | |
|---|---|---|---|
| 6,241,058 B1 * | 6/2001 | Shute et al. | 188/250 B |
| 6,336,532 B1 | 1/2002 | Samolowicz | |
| 6,581,732 B1 | 6/2003 | Shute et al. | |
| 6,588,553 B1 | 7/2003 | Wirth | |
| 2002/0108824 A1 | 8/2002 | Shute et al. | |
| 2003/0146051 A1 | 8/2003 | Velayutha | |
| 2003/0234143 A1 | 12/2003 | Shute et al. | |
| 2007/0199779 A1 | 8/2007 | Tatera et al. | |

OTHER PUBLICATIONS

"Anchor High Friction Composition Brake Shoe"; Aug. 27, 1981; 1 page; Drawing No. Anchor H31; Griffin Wheel Company.

Low Friction Composition Brake Shoe 14" Locomotive, Jul. 19, 2000, Anchor Brake Shoe, LLC.

Brake Shoe Back Plate H35 Style, May 3, 1996, Anchor Brake Shoe, LLC.

Two photographs of a brake shoe, undated.

* cited by examiner

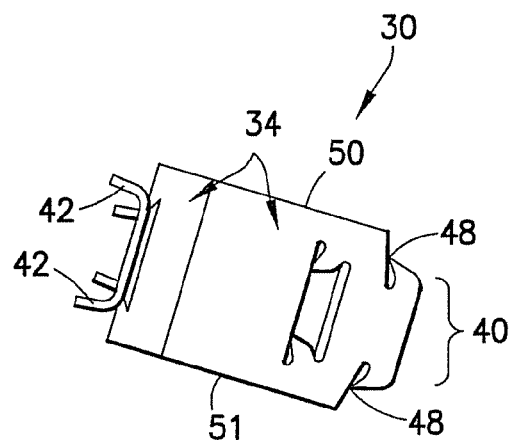
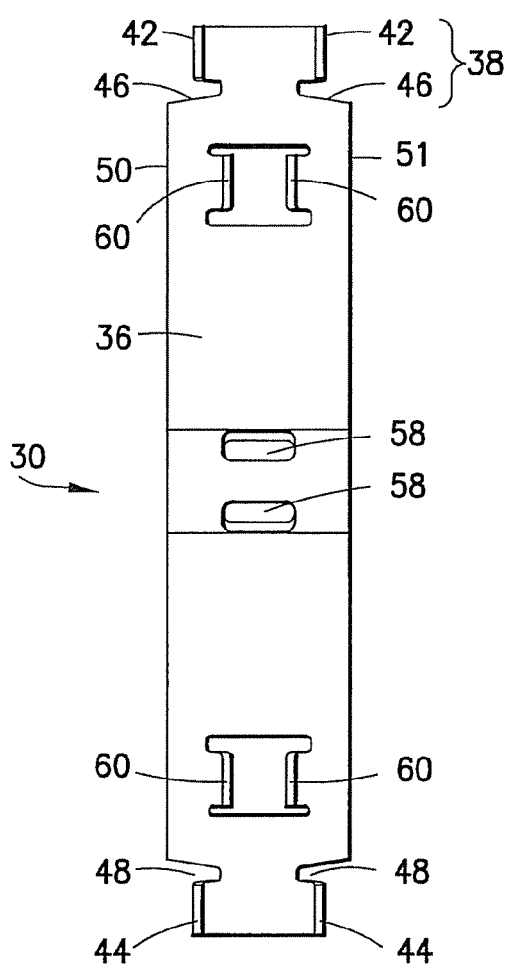
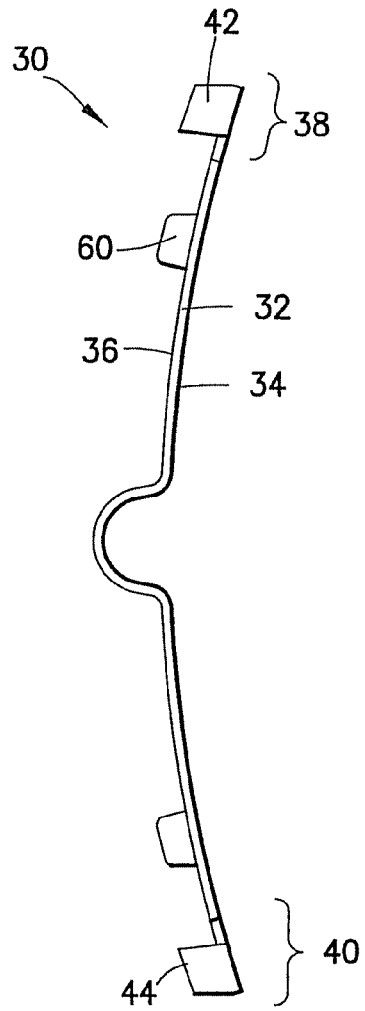
FIG.4C
FIG.4A
FIG.4B

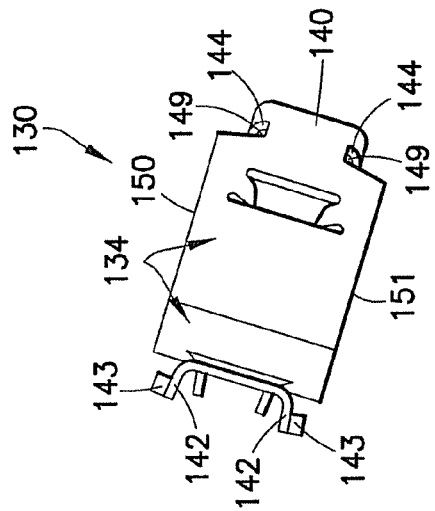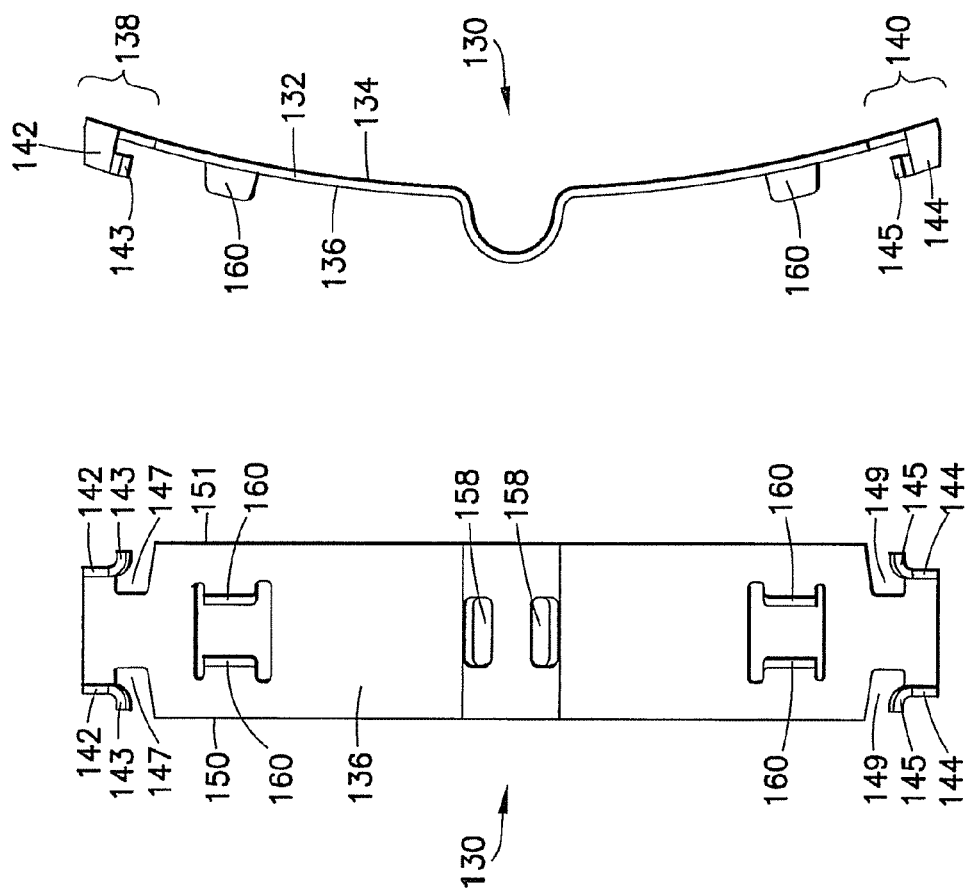

END STABILIZATION FOR BRAKE SHOES EXTENDING BEYOND THE ENDS OF THE BRAKE HEAD

BACKGROUND OF THE INVENTION

1. Field of the Invention

The present invention relates, in general, to a backing plate for a brake shoe for use in a railway braking system and, more particularly, to a backing plate having end portions which stabilize portions of brake shoes which extend beyond the ends of a brake head.

2. Description of Related Art

Railway vehicles traditionally use a braking system wherein a brake shoe is forced against the wheel surface of the vehicle to provide a retarding force. The brake shoe is mounted to a brake head that is used to locate the brake shoe and provide the braking force to the brake shoe. The brake shoe has been constricted from a variety of materials, such as metal, wood, and more recently, composition friction material. Composition brake shoes for use in railway braking systems typically include a composition of friction material bonded to a steel backing plate. FIG. 1 shows an example of a composite brake shoe 10 mounted to a railway vehicle freight car brake head 13. This brake shoe 10 is bonded to a steel backing plate 15 such as with a binder material 14 and the assembly is held in place on the vehicle brake head with a key member 16. U.S. Pat. No. 4,466,513 to Dedek shows another example of a composition brake shoe for use in a railway vehicle braking system. U.S. Pat. No. 6,581,732 to Shute et al. shows a composition brake shoe having a backing plate wherein the brake shoe is attached to the brake head without the use of a key. The backing plate includes members disposed adjacent each end of the backing plate for securing the backing plate to a brake head.

Brake heads, such as those described above, and used on freight cars, passenger cars, transit vehicles and locomotives, are typically about 12 inches long. Brake shoes for freight cars and some passenger cars and transit vehicles are also 12 inches long. Some locomotives and passenger cars use brake shoes that are 14 inches or longer. These longer shoes increase the wear life of the shoe by increasing the volume of friction material and also improve the stability of the brake shoe and head as the brakes are applied.

FIG. 2 shows an example of an extended length brake shoe 18 mounted on a typically sized length brake head 20. The composite brake shoe 18 is bonded to a steel backing plate 21. The brake shoe 18, which is formed from a composition friction material, is secured to the backing plate via any known composition binder material 19 which has excellent impact resistance and high strength bonding characteristics. While the application of the binder composition material 19 in conjunction with the friction composition material is preferred, the composition friction material itself may have sufficient bonding characteristics as to be suitable for securing the brake shoe 18 to the backing plate 21. The brake shoe 18 has a predetermined length such that the end portions thereof 22 extend a predetermined distance beyond the ends of a brake head 20. These longer brake shoes 18 increase the wear life of the shoe by increasing the volume of friction material available for braking. The use of these longer brake shoes 18 also improve the stability of the brake shoe 18 and brake head 20 as the brakes are applied due to the increased surface area of the brake shoes 18. As shown in FIG. 3, under certain conditions, the end(s) 22 of the brake shoe 18 can experience sufficient force during brake applications to cause the steel backing plate to bend at bend point 24 around the end of the brake head 20. When this occurs, the composition friction material cracks 26 at the bend point 24. This friction material may even fall off of the bent end of the backing plate 21. Currently, the only resistance to this bending force is the inherent strength of the steel backing plate 21 and the composition material itself. In some instances, this resistance is insufficient to prevent bending or cracking.

U.S. Pat. No. 4,000,792 to Guldin discloses a brake shoe and head assembly that has been converted from wood brake shoe use to composition brake shoe use. As shown in FIG. 4 of the Guldin patent, each end of the composition brake shoe includes a tab extending from a partial backing plate portion of the shoe. Each tab includes a hole for receiving a screw therethrough. Each end of the brake head includes an anchor member that is aligned with the respective hole of each tab. The screw is then used to secure the brake shoe to the brake head. The tabs are used for attachment purposes as opposed to providing stabilization to the ends of the brake shoe. In fact, Guldin even teaches that the backing plate is segmented with gaps causing stress points between the tab portion and the central portion of the backing plate. Thus, the Guldin patent does not disclose the necessary structural design that would increase the strength of the brake shoe along the entire length thereof.

There is a need in the art for a single piece backing plate capable of providing sufficient strength and continuity along its length and having additional strength at its ends for supporting an extended length composition brake shoe. This additional strength at the ends of the backing plate stabilize the brake shoe and prevent cracking of the portions of the brake shoe which extend beyond the length of the brake head.

SUMMARY OF THE INVENTION

It is, therefore, an aspect of the present invention to provide a backing plate for a brake shoe for use in a railway braking system that overcome the drawbacks and deficiencies of the prior art. It is another aspect of the present invention to provide a backing plate which stabilizes the portion of the brake shoe which extends beyond the ends of a brake head. It is a further aspect of the present invention to provide a backing plate which stabilizes the brake shoe and is simple to manufacture and does not require additional components. It is another aspect of the present invention to provide an extended length end stabilized brake shoe wherein breakage of the brake shoe at the end portions is reduced and/or eliminated.

Accordingly, the present invention is directed to an end stabilized backing plate for a brake shoe for use in a railway braking system. The backing plate includes an elongated main portion extending along a longitudinal axis. This main portion has a front face, a back face, a first end portion and a second end portion. The first and second end portions are provided on opposing ends of the elongated main portion. First and second pair of tab members are provided on each of the first and second end portions for stabilizing the end portions of the backing plate. Preferably, the first and second pair of tab members are integrally formed with each of the first and second end portions by forming a pair of notches at each end of the main portion. Each of the notches are formed through opposing edges of the main portion and extending a predetermined distance into the main body. The tab members are formed by bending the end portions along these notches such that the bent end portions extend in a substantially perpendicular direction with respect to the main body.

The present invention is also directed to an end stabilized brake shoe for use in a railway vehicle braking system. The brake shoe includes a backing plate having a predetermined configuration. The backing plate includes an elongated main portion having a front face and a back face, and a first and second pair of tab members located at opposing ends of the main portion. The tab members extend from the main portion in a rearward direction with respect to the front face of the backing plate. A composition friction material is associated with the front face of the backing plate. Attachment locations are provided on the back face of the main portion of the backing plate. These attachment locations are adapted for attachment of the backing plate with a brake head. Preferably, the first and second pair of tab members are integrally formed with the backing plate and the composition friction material is molded around the pair of tab members.

The present invention is further directed to a method of stabilizing ends of a brake shoe for use in a railway vehicle braking system which includes; (a) providing a backing plate having a predetermined configuration and an elongated main body portion having a front face and a back face; (b) providing a first and second pair of tab members located at opposing ends of the main body portion such that the first and second pair of tab members extend from the main body portion in a rearward direction with respect to the front face of the backing plate; (c) attaching a composition friction material with the front face of the backing plate; and (d) providing attachment locations on the back face of the main body portion of the backing plate. The attachment locations are adapted for attachment of the backing plate with a brake head.

These and other features and characteristics of the present invention, as well as the methods of operation and functions of the related elements of structures and the combination of parts and economies of manufacture, will become more apparent upon consideration of the following description with reference to the accompanying drawings, all of which form a part of this specification wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

FIG. 4A is a back view of an end stabilized backing plate according to a first embodiment of the present invention for use with an extended length brake shoe;

FIG. 4B is a side view of the backing plate of FIG. 4A;

FIG. 4C is an end view of the backing plate of FIG. 4A;

FIG. 7A is a back view of an end stabilized backing plate according to a second embodiment of the present invention for use with an extended length brake shoe;

FIG. 7B is a side view of the backing plate of FIG. 7A;

FIG. 7C is an end view of the backing plate of FIG. 7B;

DESCRIPTION OF THE PREFERRED EMBODIMENTS

Figure 1:
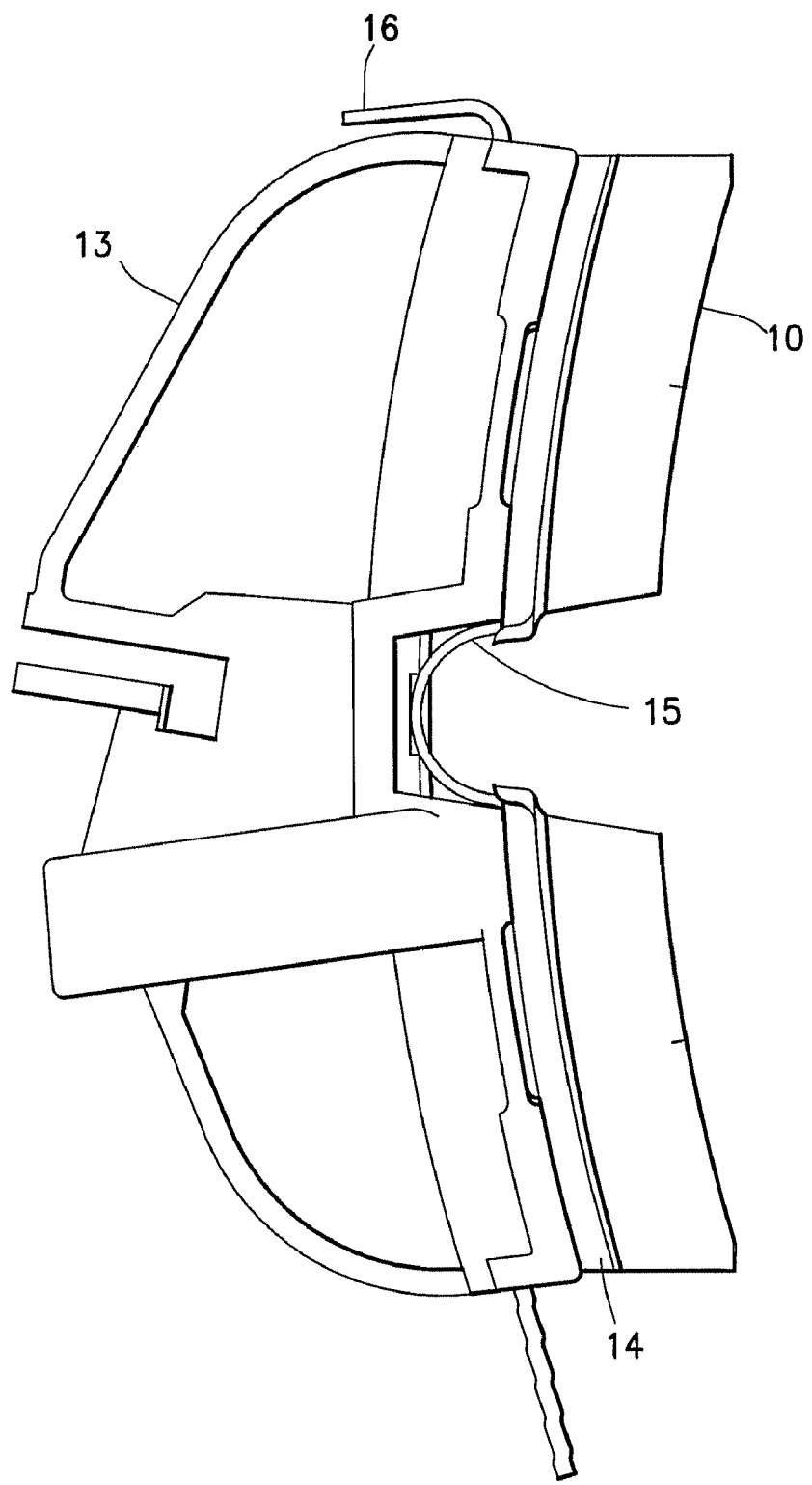
FIG. 1 is a side elevational view of a conventional freight car brake shoe mounted on a brake head.
Figure 2:
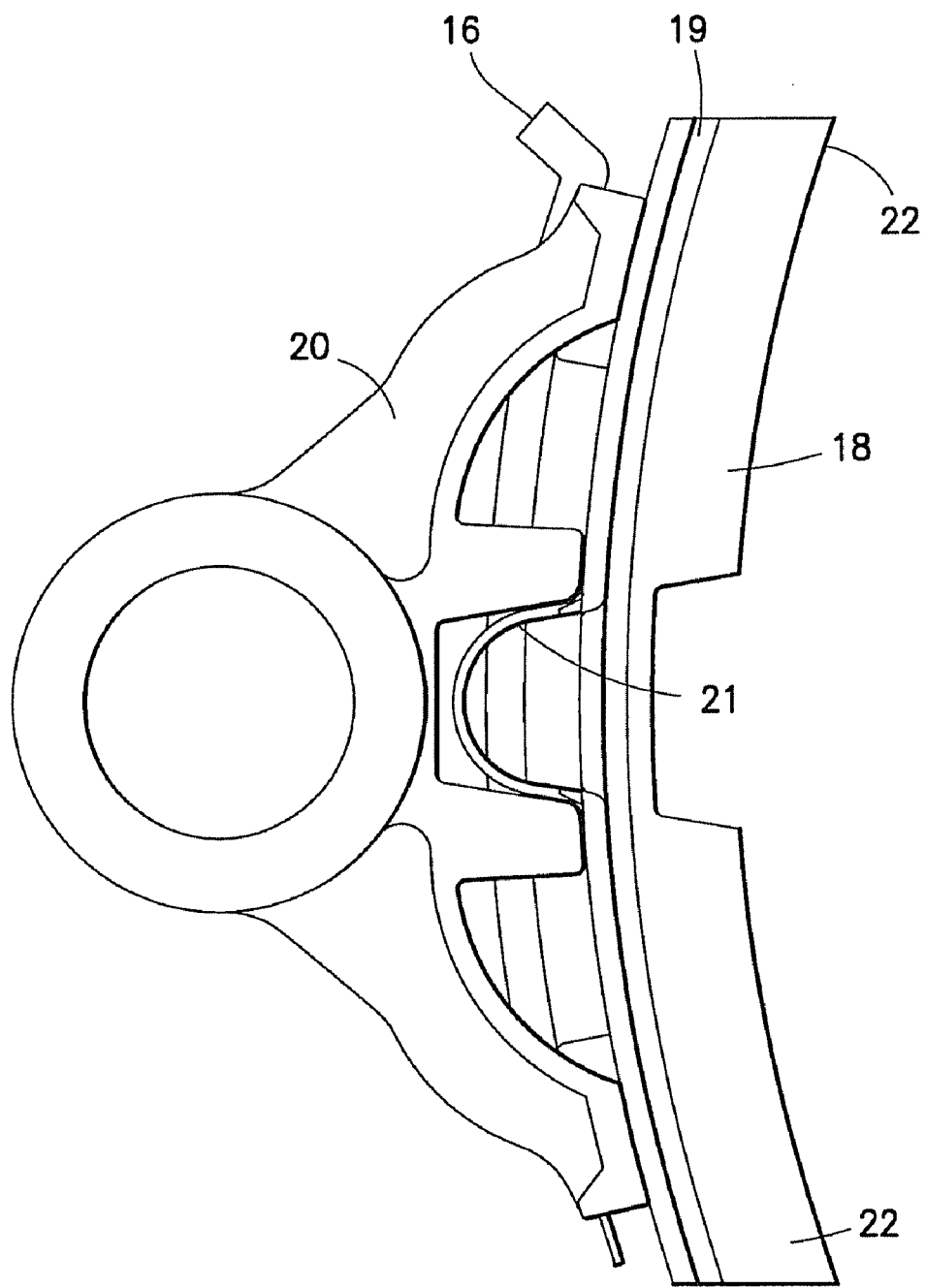
FIG. 2 is a side elevational view of a conventional extended length locomotive brake shoe mounted on a brake head.
Figure 3:
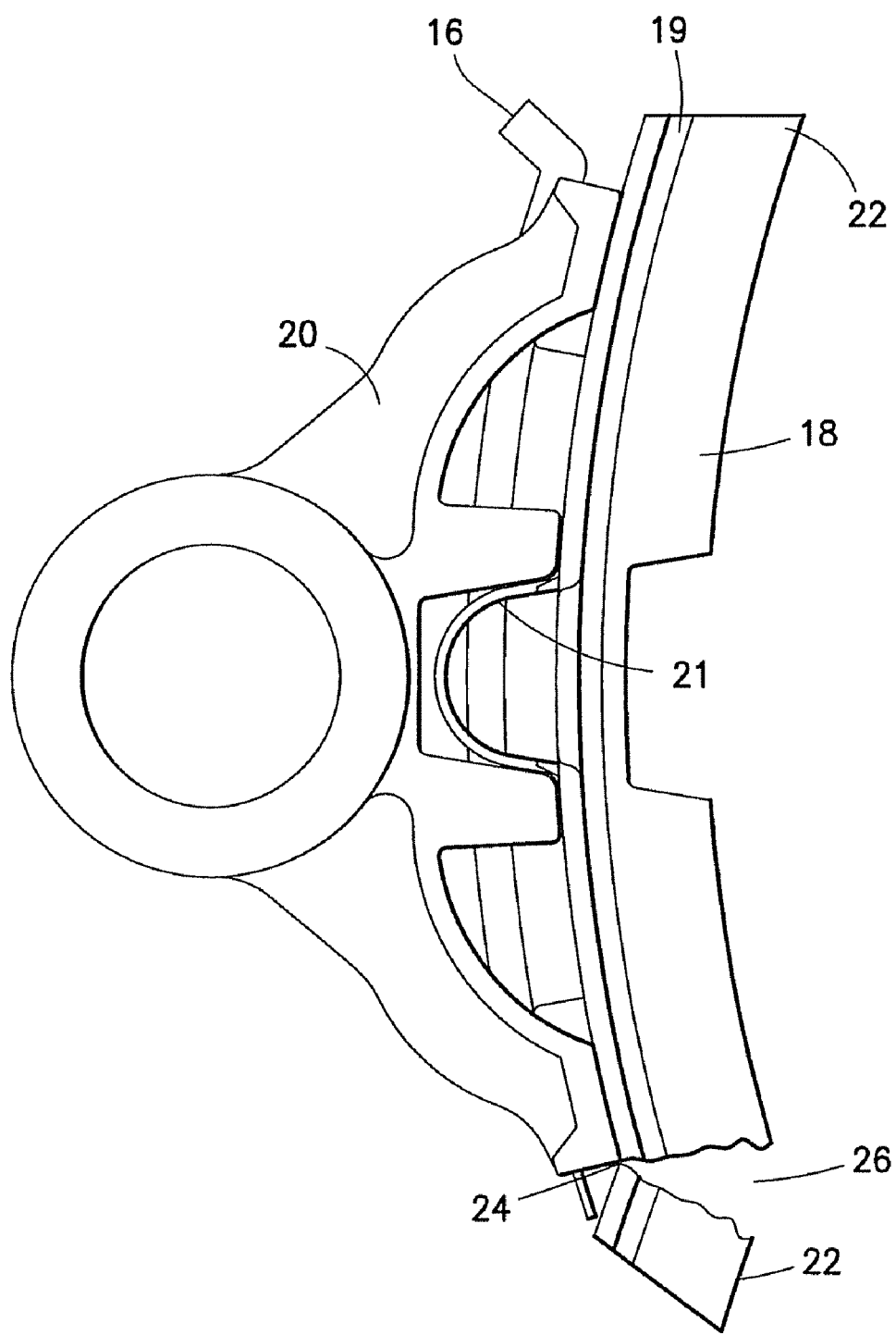
FIG. 3 is a side elevational view the brake shoe/brake head arrangement of FIG. 2 wherein an end portion of the brake shoe extending beyond the end of the brake head is broken.
Figure 4E:
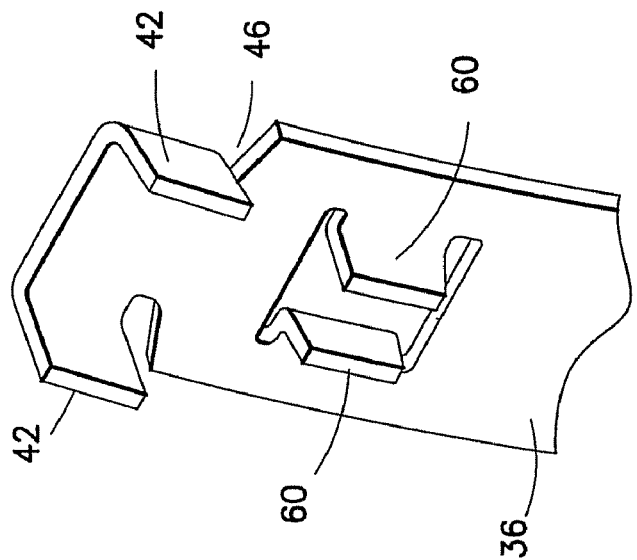
FIG. 4E is a detail isometric view of the tab member of FIG. 4D.
Figure 4D:
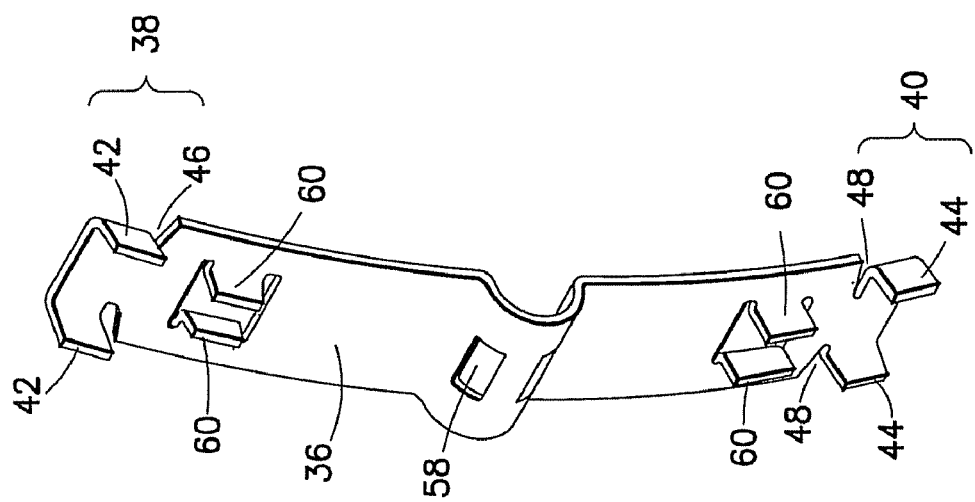
FIG. 4D is an isometric back view of the end stabilized backing plate of FIG. 4A.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific components illustrated in the attached drawings, and described in the following specification, are simply exemplary embodiments of the invention. Hence, specific dimensions and other physical characteristics related to the embodiments disclosed herein are not to be considered as limiting.

Reference is now made to FIGS. 4A-4E which show the end stabilized backing plate, generally illustrated as 30, according to a first embodiment of the present invention which provides support for extended length brake shoes commonly used on locomotives and railway passenger cars. The backing plate includes an elongated main body portion 32 extending along a longitudinal axis, and having a front face 34 and a back face 36. The backing plate also includes a first end portion 38 and a second end portion 40 provided on opposing ends of the elongated main portion 32. A first pair of tab members 42 is provided on the first end portion 38 of the backing plate 30. A second pair of tab members 44 is provided on the second end portion 40 of the backing plate 30. The first and second pair of tab members 42, 44 stabilize the first and second end portions 38, 40 of the backing plate 30.

Preferably, the first and second pair of tab members 42, 44 are integrally formed with each of the first and second end portions 38, 40. These tab members are formed by defining the first end portion 38 and the second end portion 40 with a pair of notches 46, 48 at each end of the main body portion 32. Each of these notches 46, 48 are formed through opposing edges 50, 51 of the main body portion 32 and extend a predetermined distance into the main body portion 32 of the backing plate 30. The first and second pair of tab members 42, 44 are formed by bending the first and second end portions 38, 40 along these notches 46, 48 such that the bent end portions forming tabs 42, 44 extend in a substantially perpendicular direction with respect to the main body portion 32.

Other techniques may be used to form the first and second pair of tabs 42, 44 to the opposing first and second end portions 38, 40 of the main body portion 32. These other techniques include other forming methods, the application of separate rearward extending components attached to main body portion 32 or by molding composition material around the end of the backing plate 30 when the brake shoe is formed.

Figure 5:
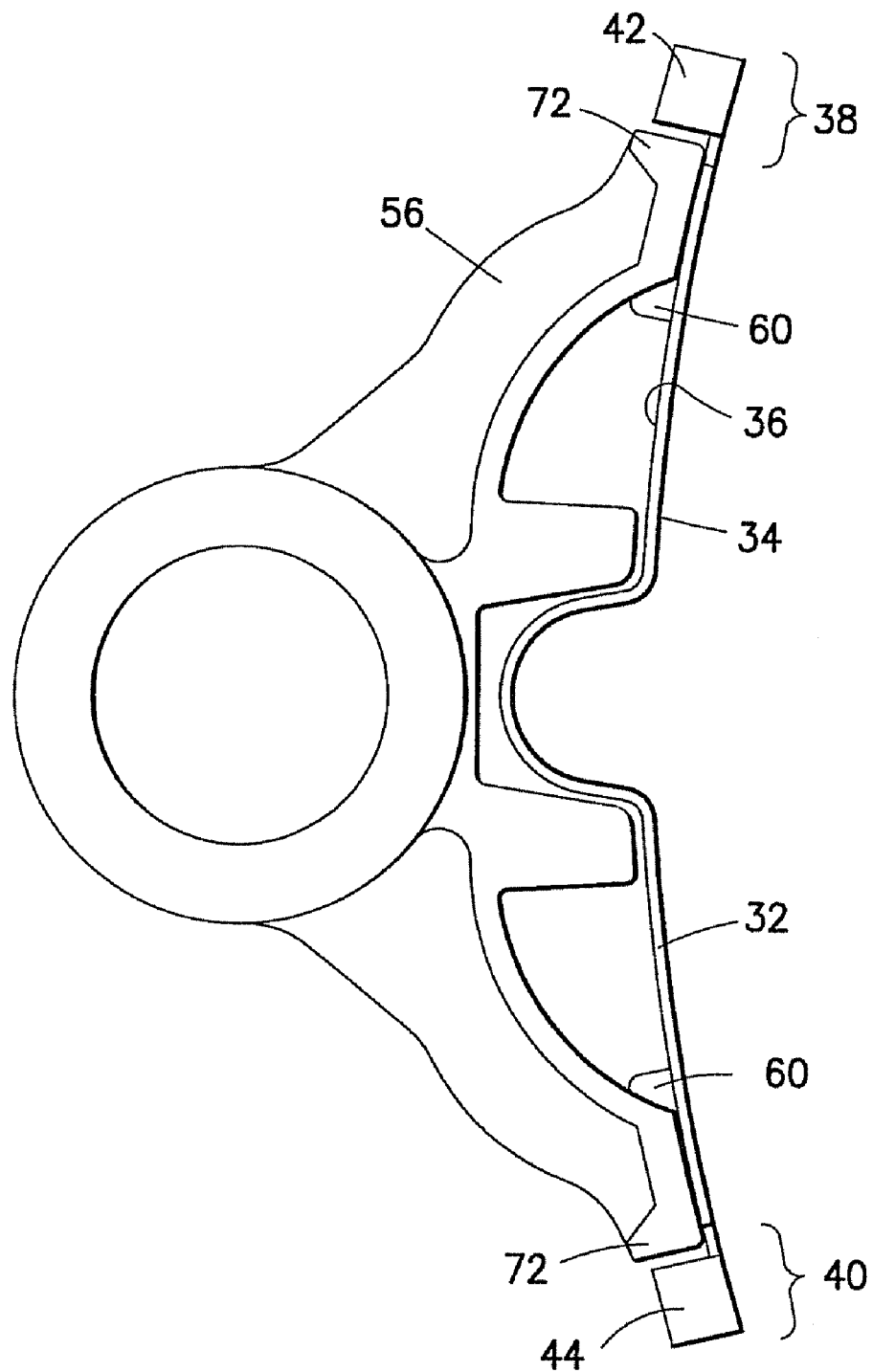
FIG. 5 is a side elevational view of a locomotive brake head including the end stabilized backing plate according to the first embodiment of the present invention.
Figure 6B:
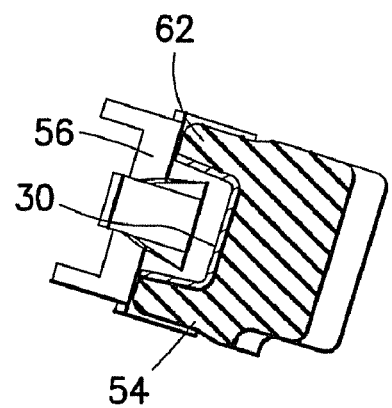
FIG. 6B is a cross-sectional view taken along line 6B-6B of FIG. 6A.
Figure 6A:
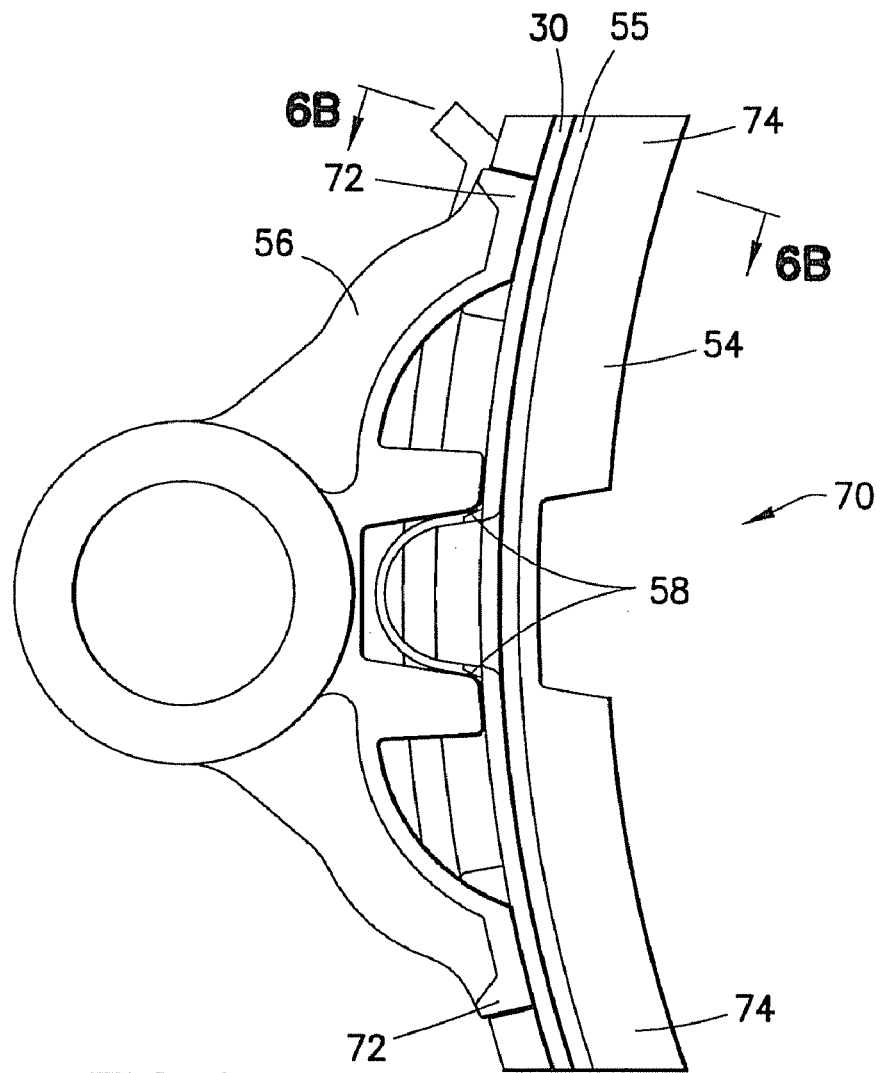
FIG. 6A is a side elevation view of a locomotive brake head/brake shoe arrangement including the end stabilized backing plate of the present invention.
Figure 7E:
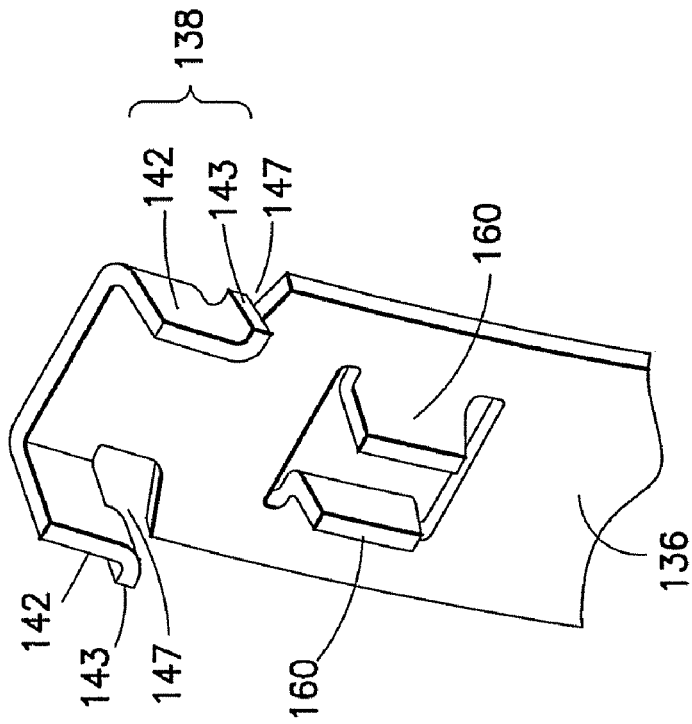
FIG. 7E is a detail isometric view of the tab member of FIG. 7D.
Figure 7D:
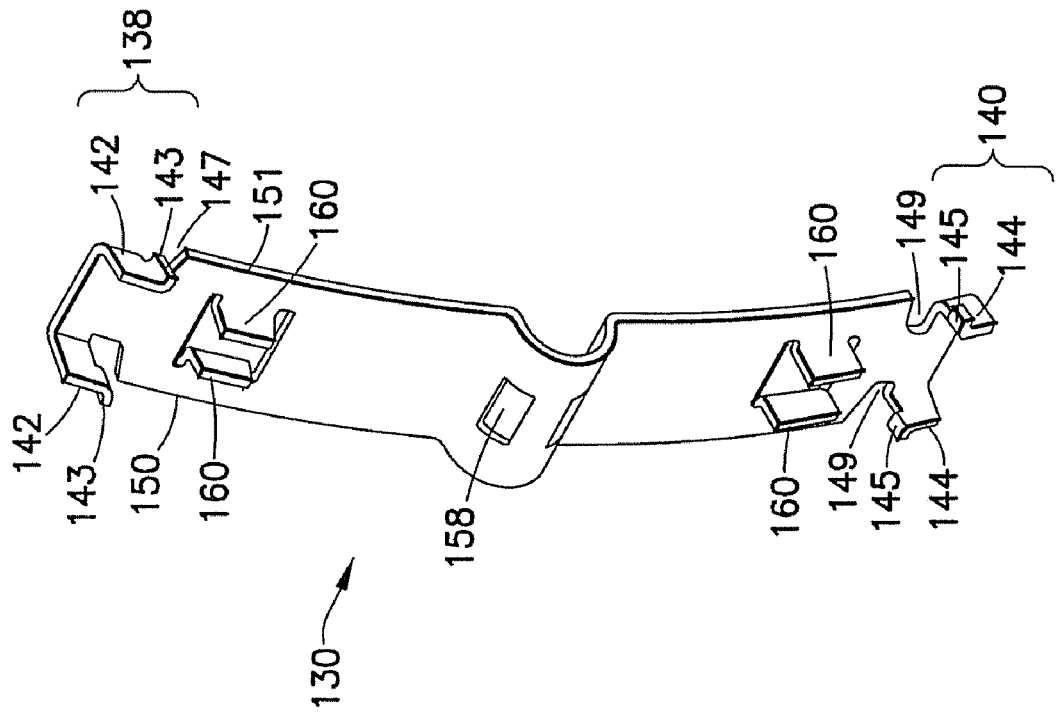
FIG. 7D is an isometric back view of the end stabilized backing plate of FIG. 7A.

As illustrated in FIGS. 5, 6A and 6B, the front face 34 of the main body portion 32 is adapted for attachment of a brake shoe 54 wherein this brake shoe 54 is formed of a composition friction material. The brake shoe 54 can be secured to the backing plate 30 with or without a binder composition material 55. This binder composition material 55 can be any known binder material that has excellent impact resistance and high strength bonding characteristics, however, the use of this binder is not always necessary as the composition friction material itself may have sufficient bonding characteristics as to be suitable for attachment of the brake shoe 54 to the backing plate 30.

The back face 36 of the main body portion 32 is adapted for attachment to a brake head 56. This attachment can be achieved by any well known technique, such as with a key, which cooperates with attachment members 58, shown in FIG. 4A, or without a key as is known in the art. The backing plate 30 may also include rejection lugs 60, which are typically used to prevent the brake shoe from being assembled to a brake beam which does not have complementary indentations formed as part of the brake head. These rejection lugs 60 can be formed by a notching and bending technique.

The backing plate 30 is formed such that the first and second pair of tab members 42, 44 extend in a rearward direction with respect to the front face of the main body portion 32. Preferably the backing plate 30 is formed by a stamping process wherein the first and second pair of notches 46, 48 and the openings for the rejection lugs 60 are formed in this single stamping step.

As illustrated in FIG. 6B, the composition friction material of the brake shoe 54 can be molded at 62 around the first and second pair of tab members 42, 44. Molding the composition friction material around the first and second pair of tab members 42, 44 would improve the bonding between the brake shoe 54 and the backing plate 30.

According to another aspect of the invention, an end stabilized brake shoe, generally shown as 70, for use in a railway vehicle braking system, is shown in FIG. 6A. The brake shoe 70 comprises a backing plate 30 as discussed in detail above and shown in FIGS. 4A-4C. The backing plate 30 has a predetermined configuration and comprises an elongated main body portion 32 having front face 34 and back face 36. The first and second pair of tab members 42, 44 are located at opposing ends 38, 40 of the main body portion 32. The tab members extend from the main body portion 32 in a rearward direction with respect to the front face 34 of the backing plate 30.

A composition friction material 54 is associated with the front face 34 of the backing plate 30. The composition friction material 54 may be associated with the front face 34 of the backing plate 30 by a well known binder/adhesive composition material 55 or the composition friction material 54 may have sufficient bonding capabilities such that it may be attached without a binder material.

Attachment locations/members 58 are provided on the back face 36 of the main body portion 32 of the backing plate 30. These attachment locations 58 are adapted for attachment of the backing plate 30 with the brake head 56. As one example, these attachment locations/members 58 can comprise openings in the backing plate 30 which allow for the insertion of a key member 16, such as shown in FIG. 1. Alternatively, a keyless attachment system, as known in the art, may be used to attach the backing plate 30 to the brake head 56.

The brake head 56 includes opposing end portions 72. The first and second pair of tab members 42, 44 are adapted to extend beyond and adjacent to these end portions 72 of the brake head 56. This design allows the first and second pair of tab members 42, 44 of the backing plate 30 to stabilize the portions 74 of the extended length brake shoe 54 which extend beyond the end portions 72 of the brake head 56, thus reducing and/or eliminating cracking of these extended portions 74 of the brake shoe 54 during use on the railway vehicle.

Reference is now made to FIGS. 7A-7E which show the end stabilized backing plate, generally illustrated as 130, according to a second embodiment of the present invention which provides support for extended length brake shoes commonly used on locomotives and railway passenger cars. The backing plate includes an elongated main body portion 132 extending along a longitudinal axis, and having a front face 134 and a back face 136. The backing plate also includes a first end portion 138 and a second end portion 140 provided on opposing ends of the elongated main portion 132. A first pair of tab members 142 is provided on the first end portion 138 of the backing plate 130. A second pair of tab members 144 is provided on the second end portion 140 of the backing plate 130. The first and second pair of tab members 142, 144 stabilize the first and second end portions 138, 140 of the backing plate 130.

The second embodiment differs from the first embodiment in that the tab members 142, 144 are modified to include a first and second pair of fillets 143, 145 extending toward the edges of the brake shoe to distribute the loading and avoid edge wear of the backing plate 130 and into the end surface of the brake head portion 172. These fillets 143, 145 are formed during the initial stamping of the backing plate wherein notches 46, 48 of FIGS. 4A-4C are replaced by a first and second pair of L-shaped cuts 147, 149 such that a portion of the cut extends toward the first and second pair of tab members 142, 144.

Preferably, the first and second pair of tab members 142, 144 are integrally formed with each of the first and second end portions 138, 140. Each of the L-shaped cuts 147, 149 are formed through opposing edges 150, 151 of the main body portion 132 and extend a predetermined distance into the main body portion 132 of the backing plate 130. The first and second pair of tab members 142, 144 are formed by bending the first and second end portions 138, 140 along these L-shaped cuts 147, 149 to form fillets 143, 145 which extend substantially parallel with the main body portion 132 and subsequently bending the tab members 142, 144 such that the bent end portions forming tabs 142, 144 extend in a substantially perpendicular direction with respect to the main body portion 132. As stated above, fillets 143, 145 enhance the distribution of the loading and reduces the edge wear of the backing plate 130 in the end surface of the brake head portion 172.

Figure 8:
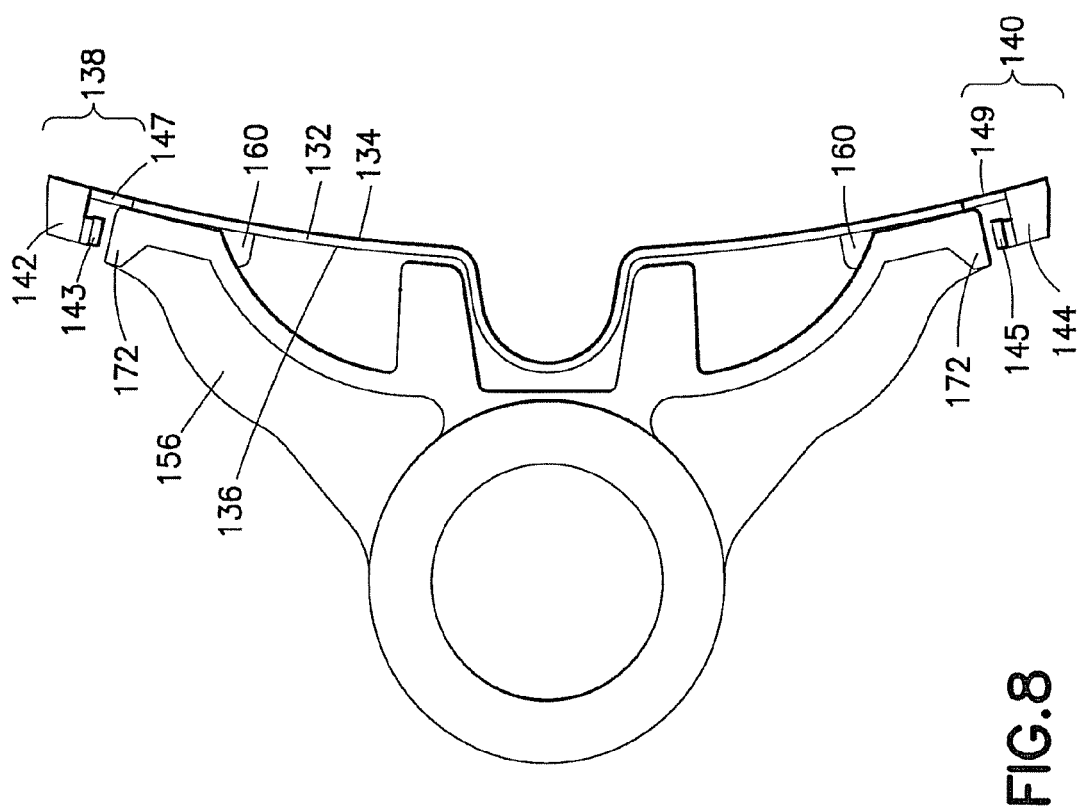
FIG. 8 is a side elevational view of a locomotive brake head including the end stabilized backing plate according to the second embodiment of the present invention.

As illustrated in FIG. 8, the back face 136 of the main body portion 132 is adapted for attachment to brake head 156. This attachment can be achieved by any well known techniques, such as with a key, which cooperates with attachment members 158, as shown in FIG. 7C, or without a key as is known in the art. The backing plate 130 may also include rejection lugs 160, which are typically used to prevent the brake shoe from being assembled to a brake beam which doe not have complementary indentations formed as part of the brake head. These rejection lugs 160 can be formed by a notching and bending technique.

The backing plate 130 is formed such that the first and second pair of tab members 142, 144 extend in a rearward direction with respect to the front face 134 of the main body portion 132. Fillets 143, 145 extend in a perpendicular position with respect to the first and second pair of tab members 142, 144 and adjacent to an end portion of brake head portion 172.

The front face 134 of the main body portion 132 is adapted for attachment of a brake shoe 54, with or without binder composition material 55, such as discussed in detail above and as shown in FIGS. 6A and 6B.

A method of stabilizing the ends of the brake shoe includes providing a backing plate 30 having a predetermined configuration and an elongated main body portion 32 having a front face 34 and a back face 36 and providing a first and second pair of tab members 42, 44 located at opposing ends 38, 40 of the main body portion 32 such that the first and second pair of tab members 42, 44 extend from the main body portion 32 in a rearward direction with respect to the front face 34 of the backing plate 30. The method further includes attaching a composition friction material 54 with the front face 34 of the backing plate 30 and providing attachment locations/members 58 on the back face 36 of the main body portion 32 of the backing plate 30. The attachment locations/members 58 are adapted for attachment of the backing plate 30 with a brake head 56.

The first and second pair of tab members 42, 44 are integrally formed with the backing plate 30 by providing a pair of notches 46, 48 in the main body portion 32 of the backing plate 30 at each end 38, 40 thereof and bending portions of the main portion along these notches 46, 48 such that these bent portions extend in a substantially perpendicular direction with respect to the main body portion 32 of the backing plate 30 as shown in FIGS. 4A-4C. Alternatively, the backing plate 130 maybe include first and second pairs of tab members 142, 144 integrally formed with backing plate 130 by providing a first and second pair of L-shaped cuts 147, 149 such that a portion of the cut extends toward the first and second pair of tab members 142, 144 to form first and second pair of fillets 143, 145. The composition friction material 54 is preferably molded around the first and second pair of tab members 42, 44 to provide additional strength to the end portions of the brake shoe 54.

Although the invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the spirit and scope of this invention. For example, it is to be understood that the present invention contemplates that, to the extent possible, one or more features of any embodiment can be combined with one or more features of any other embodiment.

The invention claimed is:

1. An end stabilized backing plate for an extended length brake shoe for use in a railway braking system, the backing plate comprising:
    (a) an elongated main body portion extending along a longitudinal axis, the main body portion having a front face and a back face;
    (b) a first end portion and a second end portion, the first and second end portions provided on opposing ends of the elongated main body portion; and
    (c) a first pair of tab members provided on the first end portion and a second pair of tab members provided on the second end portion, said first and second pair of tab members being defined by notches formed in opposing side edges of the backing plate, wherein the first and second pair of tab members are bent to extend in a rearward direction on the opposing side edges with respect to the front face of the main body portion of the backing plate, said first and second pair of tab members stabilizing the first and second end portions of the backing plate when a lateral force is applied to the backing plate.

2. The backing plate of claim 1, wherein each of the notches extends a predetermined distance into the main body portion of the backing plate.

3. The backing plate of claim 2, wherein the first and second pair of tab members are formed by bending the end portions along the notches such that the bent end portions extend in a substantially perpendicular direction with respect to the main body portion of the plate.

4. The backing plate of claim 1, wherein the notches are formed as a pair of cuts at each end of the main body portion, each of the cuts being formed in the opposing side edges of the main body portion and extending a predetermined distance into the main body portion of the backing plate.

5. The backing plate of claim 4, wherein the first and second pair of tab members are formed by bending the end portions along the cuts to form a first and second pair of fillets and further bending the end portions such that they extend in a substantially perpendicular direction with respect to the main body.

6. The backing plate of claim 1, wherein the front face of the main portion is adapted for attachment of a brake shoe thereto and the back face of the main portion is adapted for attachment to a brake head.

7. The backing plate of claim 6, wherein a brake shoe composition friction material is molded around the first and second pair of tab members.

8. The backing plate of claim 1, wherein the backing plate comprises a stamped metal plate.

9. The backing plate of claim 1, wherein the elongated main body portion comprises a rectangular member having a substantially constant width extending along a longitudinal length and wherein the opposing side edges of the backing plate comprise a substantially straight edge prior to bending along the notches formed therein to form the first and second tab members.

10. The backing plate of claim 1, wherein the first and second pair of tab members form a perpendicular support with respect to the applied lateral force to the front face of the backing plate.

11. The backing plate of claim 1, wherein the notches formed in the opposing side edges of the backing plate comprise V-shaped or U-shaped notches.

12. An end stabilized extended length brake shoe for use in a railway vehicle braking system, the brake shoe comprising:
    (a) a backing plate having a predetermined configuration, the backing plate comprising an elongated main body portion having a front face and a back face, and a first and second pair of tab members located at opposing ends of the main body portion, the first and second pair of tab members being defined by notches formed in opposing side edges of the backing plate, wherein the first and second pair of tab members are bent to extend in a rearward direction on the opposing side edges with respect to the front face of the main body portion of the backing plate, said first and second pair of tab members stabilizing the first and second end portions of the backing plate when a lateral force is applied to the backing plate;
    (b) a composition friction material associated with the front face of the backing plate; and
    (c) attachment locations on the back face of the main body portion of the backing plate, the attachment locations adapted for attachment of the backing plate with a brake head.

13. The brake shoe of claim 12 wherein the composition friction material is molded around the first and second pair of tab members.

14. The brake shoe of claim 13, wherein the first and second tab members are bent along the notches to extend in a substantially perpendicular direction with respect to the main body portion of the backing plate.

15. The backing plate of claim 13, wherein the notches are formed as a pair of cuts at each end of the main body portion, each of the cuts being formed in the opposing side edges of the main body portion and extending a predetermined distance into the main body portion of the backing plate.

16. The brake shoe of claim 12, wherein the first and second pair of tab members on each end of the backing plate extend in a substantially parallel direction with respect to one another and are adapted to extend beyond and adjacent to end portions of the brake head.

17. The brake shoe of claim 12, including a pair of rejection lugs extending in a rearward direction with respect to the main body portion of the backing plate.

18. The brake shoe of claim 12, wherein the predetermined configuration of the backing plate comprises a rectangular member having a substantially constant width extending along a longitudinal length and wherein the opposing side edges of the backing plate comprise a substantially straight edge prior to bending along the notches formed therein to form the first and second tab members.

19. A method of stabilizing ends of an extended length brake shoe for use in a railway vehicle braking system comprising:
   (a) providing a backing plate having a predetermined configuration, the backing plate comprising an elongated main body portion having a front face and a back face,
   (b) providing a first and second pair of tab members located at opposing ends of the main body portion, the first and second pair of tab members being defined by notches formed in opposing side edges of the backing plate, wherein the first and second pair of tab members are bent to extend in a rearward direction on the opposing side edges with respect to the front face of the backing plate when a lateral force is applied to the backing plate;
   (c) attaching a composition friction material with the front face of the backing plate; and
   (d) providing attachment locations on the back face of the main body portion of the backing plate, the attachment locations adapted for attachment of the backing plate with a brake head.

20. The brake shoe of claim 12, wherein the first and second pair of tab members form a perpendicular support with respect to the applied lateral force to the front face of the brake shoe.

21. The brake shoe of claim 12, wherein the notches formed in the opposing side edges of the backing plate comprise V-shaped or U-shaped notches.

22. The method of claim 19, wherein the predetermined configuration of the backing plate comprises a rectangular member having a substantially constant width extending along a longitudinal length and wherein the opposing side edges of the backing plate comprise a substantially straight edge prior to forming notches therein and bending along the notches to form the first and second tab members.

23. The method of claim 22 wherein the first and second pair of tab members are formed by providing the pair of notches in the main body portion of the backing plate at each end thereof and bending portions of the main portion along these notches such that these bent portions extend in a substantially perpendicular direction with respect to the main body portion of the backing plate.

24. The method of claim 22 wherein the notches are formed as a pair of cuts at each end of the main body portion, each of the cuts being formed in the opposing side edges of the main body portion and extending a predetermined distance into the main body portion of the backing plate.

25. The method of claim 24, wherein a portion of the cuts extend toward the tab members and the first and second pair of tab members are formed by bending the end portions along the cuts to form a first and second pair of fillets, and further bending the end portions such that they extend in a substantially perpendicular direction with respect to the main body.

26. The method of claim 22 wherein the composition friction material is molded around the first and second pair of tab members.

* * * * *

UNITED STATES PATENT AND TRADEMARK OFFICE
CERTIFICATE OF CORRECTION

| | |
|---|---|
| PATENT NO. | : 8,307,962 B2 |
| APPLICATION NO. | : 12/128228 |
| DATED | : November 13, 2012 |
| INVENTOR(S) | : Bruce W. Shute et al. |

It is certified that error appears in the above-identified patent and that said Letters Patent is hereby corrected as shown below:

Column 9, Line 5, Claim 15, delete "backing plate" and insert -- brake shoe --

Column 10, Line 19, Claim 23, delete "claim 22" and insert -- claim 19 --

Column 10, Line 26, Claim 24, delete "claim 22" and insert -- claim 19 --

Column 10, Line 37, Claim 26, delete "claim 22" and insert -- claim 19 --

Signed and Sealed this
Nineteenth Day of February, 2013

Teresa Stanek Rea
*Acting Director of the United States Patent and Trademark Office*